Jan. 23, 1923. 1,443,322

H. LEITNER.
ELECTRIC ACCUMULATOR OR STORAGE BATTERY.
FILED JUNE 23, 1922.

Inventor
Henry Leitner
By
George A. Pruvost
atty.

Patented Jan. 23, 1923.

1,443,322

UNITED STATES PATENT OFFICE.

HENRY LEITNER, OF LONDON, ENGLAND.

ELECTRIC ACCUMULATOR OR STORAGE BATTERY.

Application filed June 23, 1922. Serial No. 570,420.

*To all whom it may concern:*

Be it known that I, HENRY LEITNER, a subject of the King of Great Britain, residing at Regent House, Kingsway, London, England, have invented new and useful Improvements in Electric Accumulators or Storage Batteries, of which the following is a specification.

The invention relates to electric accumulators or storage batteries of the kind in which each element comprises one or more pencils of active material on a lead support or conductor of square, round or other cross section, the said pencils being separated from one another by porous and (or) perforated material, which is built up to form a cellular structure for the reception of the pencils and fitting within an enclosing casing.

According to the invention I form the cellular structure of a solid block having holes therein to form receptacles for the pencil electrodes.

In a suitable arrangement for carrying out the invention the blocks are formed of wood and the holes for the electrodes are drilled therein to form cylindrical receptacles, the pencils being so shaped as not to be in intimate contact along the whole of their surfaces with the surfaces of the receptacles, for instance, a pencil of square cross section fitting within a circular receptacle and vice versa. In addition to the said holes, saw-cuts are formed in the blocks to provide additional spaces for the electrolyte.

To enable the invention to be fully understood, I will describe it by reference to the accompanying drawing, in which:—

Figure 2:
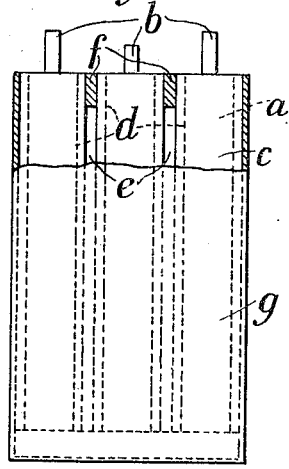
Figure 1:
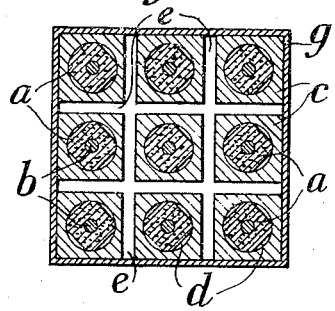

Figure 1 is a horizontal section of an electric accumulator constructed in accordance with the invention and Figure 2 is a sectional elevation thereof.

$a$ indicates the pencil electrodes constituting the battery, the said pencils being formed of active material on a lead core or support $b$ which forms a conductor.

$c$ is the block of wood and $d$ indicates the holes drilled therein to form the receptacles for the pencil electrodes $a$ which are of square form in cross section and fitting at the corners within the said holes. $e$ indicates the grooves or saw-cuts also formed in the block $c$ between the holes $d$ so as to provide additional space for the electrolyte. The said saw-cuts may have distance pieces $f$ inserted within them as indicated. $g$ is the container for the block $c$.

Claims:

1. An electric accumulator comprising a cellular structure for pencil electrodes, formed of an integral mass, said mass being provided with vertical holes to form receptacles for said electrodes, and saw-cuts formed between said holes containing the electrodes to provide additional spaces for the electrolyte.

2. An electric accumulator as claimed in claim 1, wherein the holes and saw-cuts extend partially of the depth of the structure, leaving it closed at one end.

HENRY LEITNER.